US012776681B2

(12) United States Patent
Lunøe

(10) Patent No.: US 12,776,681 B2
(45) Date of Patent: Oct. 27, 2026

(54) PUMP UNIT WITH ELECTRIC MOTOR WITH CAN HAVING AXIAL AND RADIAL DAMPING PARTS

(71) Applicant: GRUNDFOS HOLDING A/S, Bjerringbro (DK)

(72) Inventor: Morten Lunøe, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 18/929,792

(22) Filed: Oct. 29, 2024

(65) Prior Publication Data

US 2025/0141300 A1 May 1, 2025

(30) Foreign Application Priority Data

Oct. 30, 2023 (DK) .......................... PA 2023 70556

(51) Int. Cl.

*H02K 5/24* (2006.01)
*F04D 13/06* (2006.01)
*F04D 29/66* (2006.01)
*H02K 5/128* (2006.01)
*H02K 7/08* (2006.01)

(52) U.S. Cl.

CPC ........... *H02K 5/24* (2013.01); *F04D 13/0606* (2013.01); *F04D 29/669* (2013.01); *H02K 5/128* (2013.01); *H02K 7/085* (2013.01)

(58) Field of Classification Search

CPC ......... H02K 5/128-1285; F04D 13/0606-064; F16J 15/32

See application file for complete search history.

(56) References Cited

U.S. PATENT DOCUMENTS

| | | | | |
|---|---|---|---|---|
| 2,312,848 A * | 3/1943 | Pezzillo | F04D 13/0646 417/357 |
| 4,544,168 A * | 10/1985 | Hans | F16J 15/3268 277/925 |
| 5,117,138 A * | 5/1992 | Trian | H02K 5/08 310/87 |
| 2005/0238510 A1 | 10/2005 | Mitsuda et al. | |
| 2006/0251513 A1 | 11/2006 | Kalavsky et al. | |
| 2017/0302124 A1 | 10/2017 | Ehrsam | |

FOREIGN PATENT DOCUMENTS

| | | | |
|---|---|---|---|
| CN | 106363413 A | 2/2017 | |
| CN | 211116654 U | 7/2020 | |
| CN | 111649008 A | 9/2020 | |
| EP | 2604860 A1 | 6/2013 | |
| EP | 3032723 A2 | 6/2016 | |
| JP | H08159003 A * | 6/1996 | |
| KR | 102607989 B1 * | 11/2023 | F16K 31/0655 |
| WO | 2023030600 A1 | 3/2023 | |

* cited by examiner

*Primary Examiner* — Laert Dounis
(74) *Attorney, Agent, or Firm* — McGlew and Tuttle, P.C.

(57) ABSTRACT

A pump unit includes at least one impeller (4) and an electric motor connected to the at least one impeller (4). The electric motor includes a stator (12), a rotor (8) and a can (18) between the stator (12) and the rotor (8). The can (18), on its first axial end, is in engagement with a support structure (10). At least one axial damping part (32) is arranged between an axial surface (26) of the can (18) and the support structure (10), and at least one radial damping part (34) is arranged between an outer circumferential surface of the can (18) and the support structure (10).

17 Claims, 2 Drawing Sheets

PUMP UNIT WITH ELECTRIC MOTOR WITH CAN HAVING AXIAL AND RADIAL DAMPING PARTS

CROSS REFERENCE TO RELATED APPLICATIONS

This application claims the benefit of priority under 35 U.S.C. § 119 of Denmark Patent Application PA 2023 70556, filed Oct. 30, 2023, the entire contents of which are incorporated herein by reference.

TECHNICAL FIELD

The invention refers to a pump unit comprising at least one impeller and a wet-running electric motor.

BACKGROUND

Pump units like centrifugal pump devices, for example circulator pumps usually comprise at least one impeller which is driven by an electric drive motor. The electric drive motor usually is configured as a wet-running motor with a can between the stator and the rotor. The can separates the dry stator space and the wet rotor space. In common configurations there is arranged a bearing for the rotor shaft inside the rotor can. For sufficient support of the rotor can the rotor can may be in engagement with a surrounding support structure.

The can between the rotor and stator has an impact on the magnetic field between stator and rotor, since the can requires a greater distance between rotor and stator. This has a negative influence on the efficiency of the motor. To increase the efficiency, it is desired to reduce the gap between rotor and stator which requires a minimum thickness of the rotor can.

SUMMARY

It is an object of the invention to allow a can having a reduced thickness. This object is achieved by a pump unit having the features defined in claim 1. Preferred embodiments are defined in the dependent subclaims, the following description and the accompanying drawings.

The pump unit according to the invention comprises at least one impeller and an electric motor which is connected to the at least one impeller to rotate the impeller. The motor comprises a stator and a rotor, wherein the rotor is connected to the impeller, preferably via a rotor shaft. The electric motor is a wet-running electric motor with a can arranged between the stator and the rotor such that the rotor is running inside the fluid, whereas the stator is arranged in a dry space of the motor. Such a pump unit, i.e. a centrifugal pump unit, preferably is configured as a circulator pump, which may be used in hydronic systems like heating and/or cooling systems.

For support of the rotor can the can on its first axial end is in engagement with a support structure, i.e. a support structure surrounding the can. The support structure may be connected or may be part of the stator and/or the surrounding motor housing.

According to the invention there is arranged at least one axial damping part between an axial surface of the can and the support structure. Furthermore, there is arranged at least one radial damping part between an outer circumferential surface of the can and the support structure. The axial and the radial damping part allow a support of the can in axial and radial direction via a damping part arranged therebetween. The damping parts avoid vibrations occurring in the rotor can to be transferred to the surrounding support structure. Thus, the stator and other components connected to the support structure, for example an electronic housing and electronic components are kept free from vibrations. Such vibrations in particular may occur with cans having a low wall thickness. Thus, the arrangement of the damping parts in the axial and the radial support of the can allows to further reduce the wall thickness of the rotor can without undesired vibrations being transferred to the entire surrounding pump structure and further components of the pump unit. With the arrangement of an axial and a radial damping part between the can and the surrounding support structure, in particular a noise reduction can be achieved.

According to a preferred embodiment of the invention the at least one axial damping part and the at least one radial damping part are integrally formed by a single damping element. By this the number of required parts is minimized and the costs for producing the damping element can be reduced.

In a possible embodiment the at least one axial damping part is ring shaped and the at least one radial damping part is tongue shaped and extending from an inner circumference of the ring-shaped axial damping part. In a preferred embodiment several tongue shaped radial damping parts are arranged on the inner circumference of the axial damping part. The several tongue shaped radial damping parts preferably are distanced in circumferential direction from one another such that gaps or free spaces are formed between neighboring radial damping parts. Further preferably, the several radial damping parts are evenly distributed along the inner circumference of the axial damping part. The arrangement of several tongue-shaped damping parts allows an easier mounting with higher precision. The tongue shaped configuration of the radial damping parts allows to bend the radial damping parts relative to the axial damping part. This allows to create an integral damping part from a flat damping element and to bend the radial damping parts in a direction such that they can be arranged between an outer circumferential surface of the can and a surrounding support structure allowing to transmit forces in radial direction. The radial damping parts thereby substantially extend parallel to the longitudinal axis of the pump unit, i.e. the rotational axis of the impeller. The at least one axial damping part preferably extends in a direction transverse or normal to the longitudinal axis.

According to a further possible embodiment the at least one axial damping part and the at least one radial damping part are formed and preferably cut from a flat material. As described before the at least one radial damping part preferably is bend into a direction transverse to the axial damping part. This allows to easily form a three-dimensional damping comprising the axial damping part and the at least one radial damping part from a flat material. Cutting the flat material may be done by a cutting or punching device. Instead of cutting the damping parts from a flat material, the damping parts may be formed in different ways, preferably integrally formed. This may be done by a moulding and vulcanization process. Alternatively, the radial damping part and the axial damping part can be integrally formed by injection molding, 3D-printing or other suitable method. For cutting the material from a flat material, different cutting methods could be used, for example punching or water jet cutting.

Preferably the at least one axial damping part and the at least one radial damping part are made from an elastic material, preferably rubber or synthetic rubber, further preferably EPDM (ethylene propylene diene monomer rubber). Such material can be provided as a flat mat or rolled material. The flat material can be cut or punched into the desired shape, for example into a ring-shaped axial damping part with radial extending tongues arranged on its inner circumference, wherein in the following the tongues are bent in axial direction to form the radial damping parts. The elastic material provides the desired damping properties. By adapting the elasticity the material may be adapted to the vibration behavior of the can. Furthermore, such a material may provide a required stiffness to allow a transfer of occurring forces, in particular forces from a bearing assembly arranged inside the can.

The surrounding support structure for example is connected to the motor housing or a part of the motor housing. Alternatively, the support structure may be part of the stator assembly or stator device of the pump unit, for example connected or formed by an iron part of the stator assembly. Such a support structure provides a required stiffness to support a bearing assembly arranged inside the can and allowing a flux of force from the impeller via the rotor, a rotor bearing, the rotor can and the damping parts into the support structure.

The first axial end of the can, in a further embodiment, may be a closed end. Thus, the can is cup-shaped. Such a can is tightly sealed towards the stator space. Preferably a shaft bearing may be fixed inside the can, preferably close to its first axial end. Such a bearing supports the free end of the rotor shaft, i.e. the end distanced from the at least one impeller. Preferably the bearing is a radial bearing transmitting forces in radial direction. An axial bearing, preferably, is arranged close to the impeller. Furthermore, there may be a second radial bearing on the other side of the rotor, i.e. adjacent to the impeller.

The can in one example may be made from steel, in particular stainless steel. Alternatively, the can may be made from a composite material, for example a fiber reinforced plastic material. Furthermore, such a composite material may have a sealing layer or coating to provide a tightness against diffusion. Stainless steel or composite material allow to produce a rotor can with a minimized wall thickness. According to a further preferred embodiment the wall thickness of the can is smaller than 0.25 mm, further preferable smaller than 0.2 mm, for example 0.18 mm or thinner. Such minimized wall thickness in particular can be realized in a stainless steel can.

According to a further preferred embodiment the support structure comprises an axial surface facing the can and being in contact with the at least one axial damping part. This allows a transfer of axial forces from the can, via the axial damping element onto the axial surface of the support structure. Furthermore, the support structure preferably comprises an inner circumferential surface extending transverse to the axial surface and being in contact with the at least one radial damping part. This allows to transfer forces from the can, i.e. a outer circumferential wall of the can in radial direction via the radial damping part onto the inner circumferential surface of the support structure.

In the following the invention is described by way of example with reference to the accompanying drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
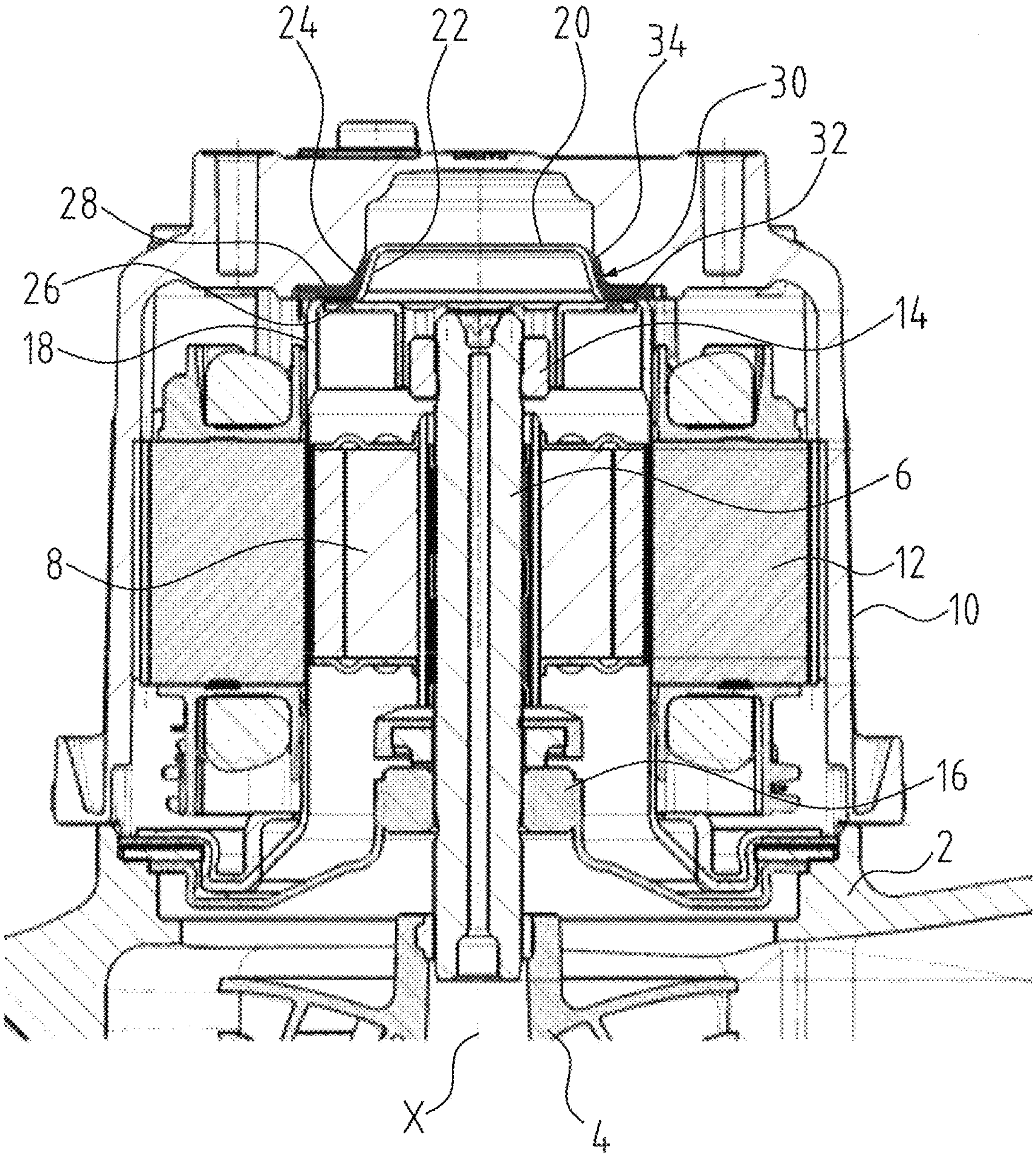
FIG. 1 shows a cross section of a pump unit according to the invention.

Referring to the drawings, the pump device shown in FIG. 1 is a centrifugal pump, which may be used as a circulator pump in a hydronic system. As usual the pump device comprises a pump housing 2 with an impeller 4 arranged therein. The impeller is connected to a rotor shaft 6 carrying a magnetic rotor 8 of an electric motor. The electric motor is arranged inside a motor housing 10 which is connected to the pump housing 2. Inside the motor housing 10 there is arranged the stator 12 of the electric motor, comprising an iron core and required coils.

The rotor shaft 6 is supported by two bearings 14 and 16, wherein both bearings 14 and 16 are radial bearings. The bearing 16 in addition acts as an axial bearing. Between the rotor 8 and the stator 12 there is arranged a can 18 separating the dry stator space which contains the stator 12 from the wet rotor space containing the rotor 8. The bearing 14 is supported inside the cup-shaped can 18 close to the closed end 20 of the can 18. To transmit forces acting on the can 18, in particular forces occurring from the bearing 14 and the pressure inside the can 18, onto a surrounding supporting structure the closed end 20 of the can 18 is engaged with the motor housing 10 as a support structure.

Close to its closed end 20 the can 18 has a circumferential wall 22 facing an inner circumferential surface 24 of the motor housing 10. Surrounding the circumferential wall 22 the can 18 as shown in FIG. 1 has a shoulder extending in a direction transverse to the rotational axis X of the impeller 4 and forming an axial support surface 26 of the can 18. This axial support surface 26 of the can 18 faces an inner axial surface 28 of the motor housing 10. Between the axial support surface 26 and the inner axial surface 28 and between the circumferential wall 22 and the inner circumferential surface 24 there is arranged a damping element 30. The damping element as an integral element comprises an axial damping part 32 which is arranged between the axial support surface 26 and the inner axial surface 28, and several radial damping parts 34 being arranged between the circumferential wall 22 and the inner circumferential wall 24.

Figure 2:
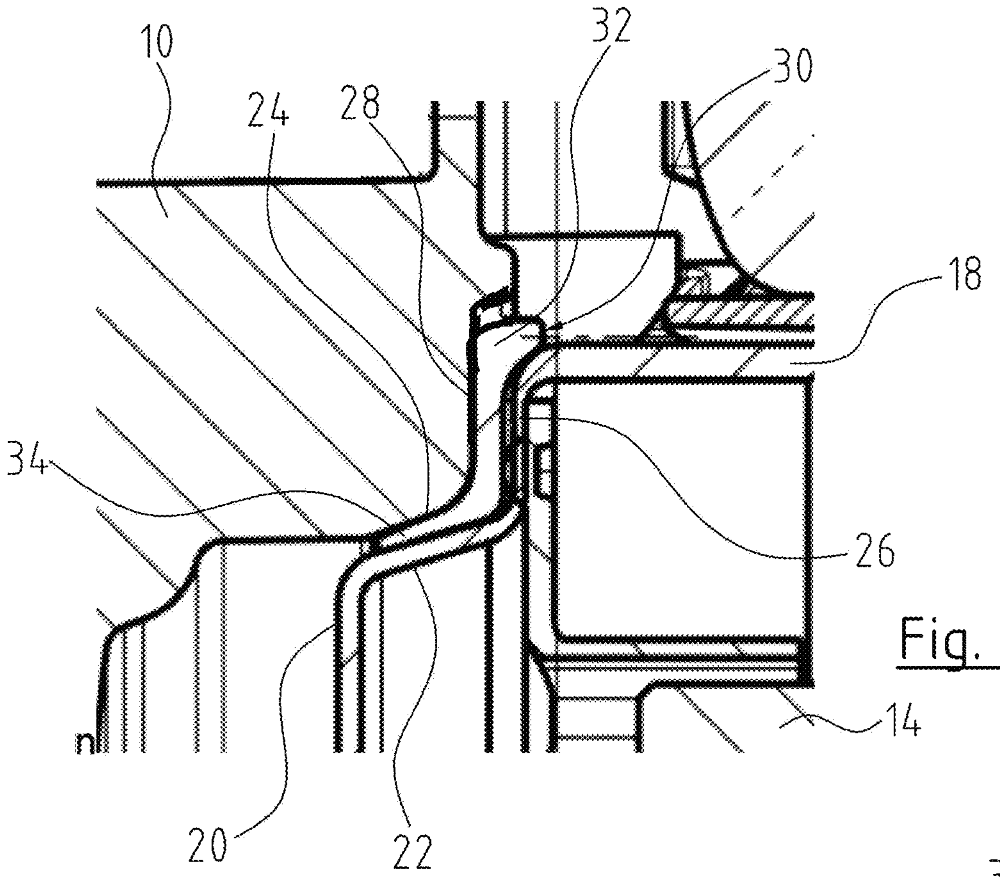
FIG. 2 showing an enlarged portion of a cross section of a pump unit according to the invention.
Figure 3:
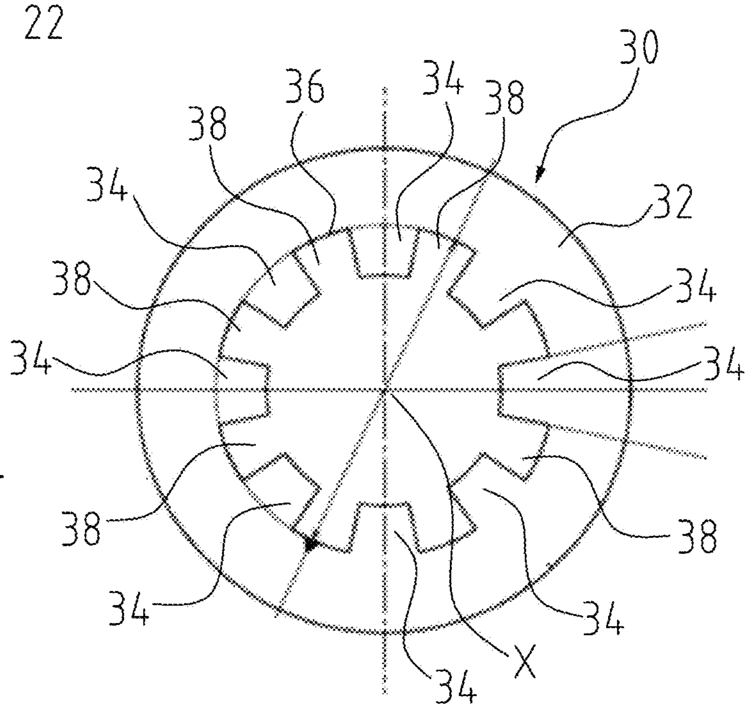
FIG. 3 shows a plan view of a damping element.

The configuration and arrangement of the damping element 30 is described in further detail with reference to FIG. 2 showing an enlarged cross-sectional view of a damping element 30 according to the invention, and with reference to FIG. 3. As can be seen in FIG. 3 the damping element 30 is produced as a flat damping element, for example from a mat of elastic material. The damping element 30 is cut in a shape consisting of a ring-shaped axial damping part 32 with the radial damping parts 34 being tongue shaped and extending from an inner circumference 36 of the ring-shaped axial damping part 32. In this example there are eight tongue shaped radial damping parts 34 which are evenly distributed over the inner circumference 36. The radial damping parts 34 are spaced from one another forming gaps or free spaces 38 therebetween. The radial damping parts 34 as seen in the top view in FIG. 3 have a trapezoidal shape narrowing towards the radial inner end.

When inserted into the motor housing 10, i.e. between the motor housing 10 and the can 18 the flat damping element 30 as shown in FIG. 3 is bent into a three-dimensional shape as shown in the cross section in FIGS. 1 and 2. In particular the radial damping parts 34 are bent into an axial direction, substantially parallel to the longitudinal axis X of the pump device. In this configuration the axial damping part 32 is arranged between the axial support surface 26 and the inner axial surface 28 and the radial damping parts 34 are arranged between the circumferential wall 22 of the can 18 and the inner circumferential surface 24 of the surrounding motor housing. By this configuration the can at its closed and 20 is supported in axial and radial direction via the damping element 30 avoiding vibrations to be transmitted from the can 18 onto the motor housing 10 and further connected parts of the pump unit as for example electronic components.

While specific embodiments of the invention have been shown and described in detail to illustrate the application of the principles of the invention, it will be understood that the invention may be embodied otherwise without departing from such principles.

REFERENCE NUMERALS

2 pump housing
4 impeller
6 rotor shaft
8 rotor
10 motor housing
12 stator
14, 16 bearings
18 can
20 closed end of the can
22 circumferential wall of the can
24 inner circumferential surface
26 axial support surface
28 inner axial surface
30 damping element
32 axial damping parts
34 radial damping parts
36 inner circumference
38 free spaces
X longitudinal axis/rotational axis

What is claimed is:

1. A pump unit comprising:
- a support structure;
- at least one impeller;
- an electric motor connected to the at least one impeller, the electric motor comprising:
  - a stator;
  - a rotor; and
  - a can between the stator and the rotor, wherein the can has a first axial can end that is in engagement with the support structure;
- at least one axial damping part arranged between an axial surface of the can and the support structure; and
- at least one radial damping part arranged between an outer circumferential surface of the can and the support structure, wherein the at least one axial damping part is ring shaped with an inner circumference and the at least one radial damping part extends from the inner circumference of the ring-shaped axial damping part,
- wherein the at least one radial damping part comprises a plurality of tongue shaped radial damping parts arranged on the inner circumference of the axial damping part,
- wherein the ring-shaped axial damping part and the tongue shaped radial damping parts are cut from a flat material, wherein the tongue shaped radial damping parts are bent into a direction transverse to the axial damping part.

2. The pump unit according to claim 1, wherein the at least one axial damping part and the at least one radial damping part are integrally formed by a single damping element.

3. The pump unit according to claim 2,
- wherein the plurality of tongue shaped radial damping parts arranged on the inner circumference of the axial damping part are spaced a distance in a circumferential direction from one another, such that gaps or free spaces are formed between neighboring radial damping parts.

4. The pump unit according to claim 1, wherein the at least one radial damping part that is tongue shaped extends from the inner circumference of the axial damping part.

5. The pump unit according to claim 1, wherein the at least one radial damping part is bent into a direction transverse to the axial damping part.

6. The pump unit according to claim 1, wherein the at least one axial damping part and the at least one radial damping part are made from an elastic material.

7. The pump unit according to claim 6, wherein the elastic material is rubber or EPDM (ethylene propylene diene monomer rubber).

8. The pump unit according to claim 1, wherein the support structure is connected to a motor housing or is a part of the motor housing.

9. The pump unit according to claim 1, wherein a first axial end of the can is a closed first axial end.

10. The pump unit according to claim 9, wherein a shaft bearing is fixed inside the can adjacent to the closed first axial end.

11. The pump unit according to claim 1, wherein the can is made from stainless steel or a composite material.

12. The pump unit according to claim 1,
- wherein the support structure comprises an axial surface facing the can, and the axial surface is in contact with the at least one axial damping part, and
- wherein the support structure comprises an inner circumferential surface extending transverse to the axial surface and the inner circumferential surface is in contact with the at least one radial damping part.

13. The pump unit according to claim 3, wherein the can comprises a radially outward facing portion engaged by the plurality of tongue shaped radial damping parts that are arranged on the inner circumference of the axial damping part.

14. A pump unit comprising:
- a support structure;
- at least one impeller;
- an electric motor connected to the at least one impeller, the electric motor comprising:
  - a stator;
  - a rotor; and
  - a can between the stator and the rotor, wherein the can has a first axial can end that is in engagement with the support structure;
- at least one axial damping part arranged between an axial surface of the can and the support structure; and at least one radial damping part arranged between an outer circumferential surface of the can and the support structure, wherein the at least one axial damping part and the at least one radial damping part are formed from a single integral flat material element.

15. The pump unit according to claim 14, wherein the at least one axial damping part comprises a ring shaped part with an inner circumference, and wherein the at least one radial damping part comprises a plurality of tongue shaped radial damping parts arranged on the inner circumference of the axial damping part and spaced a distance in a circumferential direction from one another such that gaps or free spaces are formed between neighboring radial damping parts.

16. The pump unit according to claim 15, wherein the can has a circumferential wall with a first radially outward facing can portion and a second radially outward facing can portion, wherein the second radially outward facing can portion is radially inward of the first radially outward facing can portion with an intermediate axially facing can portion between the first radially outward facing can portion and the second radially outward facing portion, and wherein the second radially outward facing portion of the can is engaged by the plurality of tongue shaped radial damping parts arranged on the inner circumference of the axial damping part and the intermediate axially facing can portion is engaged by the ring shaped part.

17. A pump unit comprising:

a support structure;

at least one impeller;

an electric motor connected to the at least one impeller, the electric motor comprising:

a stator;

a rotor; and a can between the stator and the rotor, wherein the can has a first axial can end that is in engagement with the support structure;

at least one axial damping part arranged between an axial surface of the can and the support structure; and at least one radial damping part arranged between an outer circumferential surface of the can and the support structure, wherein the at least one axial damping part and the at least one radial damping part are formed from a flat material, wherein the at least one radial damping part is bent into a direction transverse to the axial damping part, wherein the at least one axial damping part and the at least one radial damping part are integrally formed by a single damping element comprised by the flat material, wherein the at least one axial damping part is ring shaped with an inner circumference and the at least one radial damping part comprises a plurality of tongue shaped radial damping parts arranged on the inner circumference of the axial damping part and are spaced a distance in circumferential direction from one another such that gaps or free spaces are formed between neighboring radial damping parts, wherein the can has a circumferential wall with a first radially outward facing can portion and a second radially outward facing can portion, wherein the second radially outward facing can portion is radially inward of the first radially outward facing can portion with an intermediate axially facing can portion between the first radially outward facing can portion and the second radially outward facing portion, and wherein the second radially outward facing portion of the can is engaged by the plurality of tongue shaped radial damping parts arranged on the inner circumference of the axial damping part and the intermediate axially facing can portion is engaged by the ring shaped part.

* * * * *